UNITED STATES PATENT OFFICE.

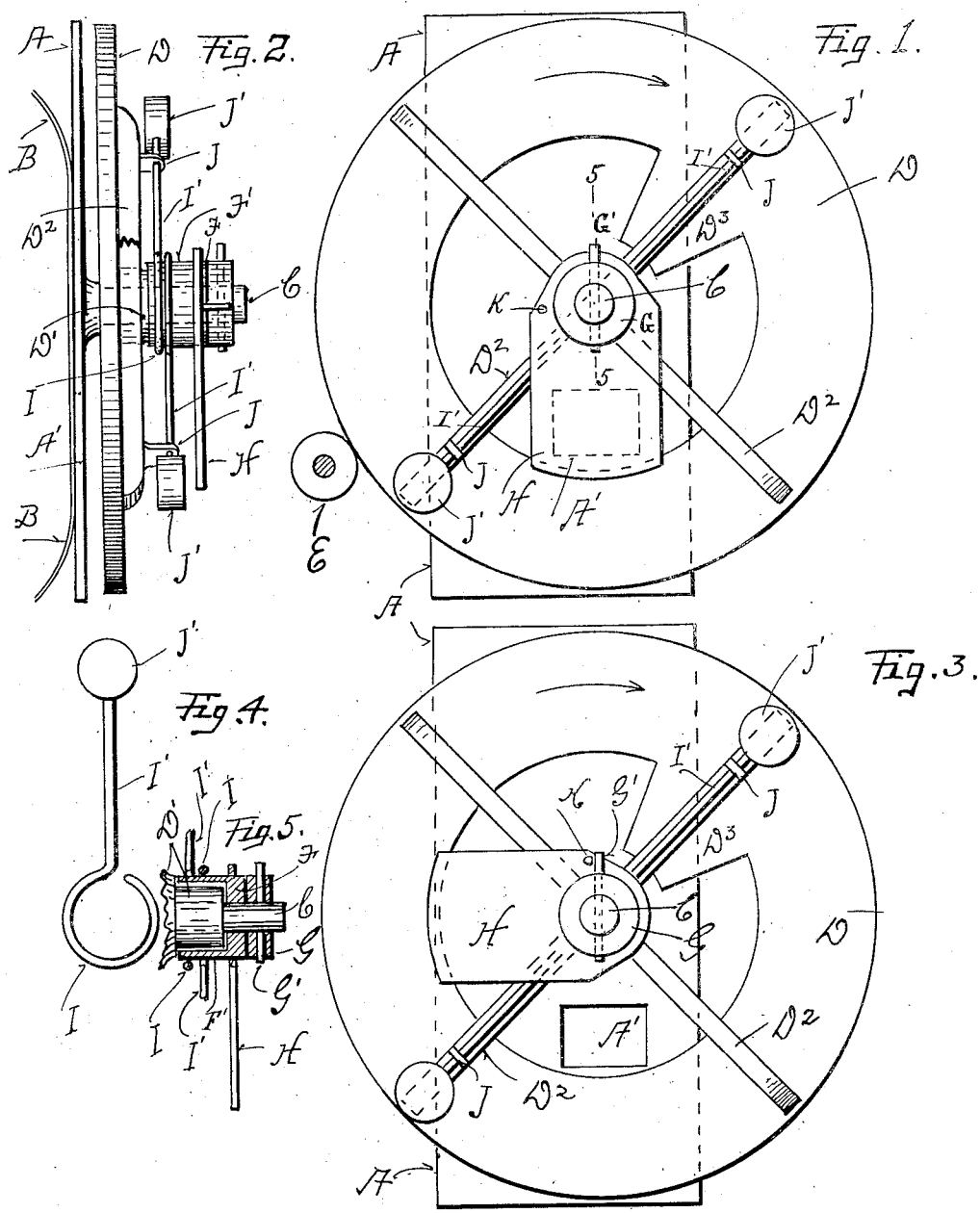

CHARLES FRANCIS JENKINS, OF WASHINGTON, DISTRICT OF COLUMBIA.

MOTION-PICTURE APPARATUS.

1,152,515.   Specification of Letters Patent.   Patented Sept. 7, 1915.

Application filed December 16, 1914. Serial No. 877,592.

*To all whom it may concern:*

Be it known that I, CHARLES FRANCIS JENKINS, a citizen of the United States, residing at Washington, in the District of Columbia, have invented certain new and useful Improvements in Motion-Picture Apparatus, of which the following is a specification, reference being had therein to the accompanying drawing.

The general object of this invention is to provide for using highly inflammable film with practical safety, and with this aim in view, I provide automatic means whereby light is permitted to reach the film only when the latter is moving at a speed such that there is no danger of ignition.

For illustration I show the invention as applied to a machine having a rotary shutter and a distinct member normally in position and automatically returning to position to bar the light beam from the film, and means whereby the shutter when it has not less than a predetermined speed moves said member out of its normal light-obstructing position and so holds it so long as the speed is maintained.

In the accompanying drawings, Figure 1 shows in front elevation a part of a projecting machine provided with my devices. Fig. 2 is a side elevation of the same devices. Fig. 3 is a view similar to Fig. 1 showing the devices in condition for allowing a projecting light beam to pass to the picture film. Fig. 4 is a detached view of a clutch member. Fig. 5 is a section on the line 5—5, Fig. 1.

In these views, A represents a fixed vertical plate forming a part of the frame of the projecting machine and provided with an aperture A' for the passage of light to a film at B. From the plate projects a short shaft C and on this shaft rotates a shutter consisting in this instance of an annular plate D supported from a hub D' by spokes D² and having an inwardly projecting sector D³ for interrupting the light at proper intervals. The shutter is rotated by a friction wheel E, or other suitable means, and upon the shaft C, at the outer end of the hub is loosely mounted a disk F from which a rigid sleeve F' projects toward the shutter and as shown in this instance loosely encircles a portion of the hub. The disk is held against material outward movement by a collar G secured to the shaft by a pin G', and to the disk is secured a plate H which is normally held pendant by gravity, in position to bar the passage of light to the aperture A'. Around the sleeve pass two distinct nearly radial and adjacent hooks or loops I formed at the inner ends of wires or rods I' which slide freely in bearings J on the spokes although they rotate bodily with the shutter. They preferably bear at their free outer ends small weights J' which add to the centrifugal force with which they are urged outward when the shutter is in rapid rotation. The centrifugal pull upon one hook balances the like pull upon the other so that when the hooks frictionally engage the sleeve there is no tendency to move the sleeve out of normal alinement. Obviously when the rotation is rapid, the sleeve, disk and plate H will be impelled to rotate with the shutter and the plate H will be rotated out of beam-obstructing position. Its movement is limited however to about 90° by a projection K upon the plate and a suitable stop therefor, shown for illustration as the pin G', before mentioned. The plate when thus out of position for obstructing the light beam is constantly urged to return thereto by gravity, and it will so return whenever the centrifugal pull upon the hooks falls sufficiently to permit. Obviously other means may be employed for gently urging the return of the displaced plate H, if the arrangement in any case makes it desirable, for example when it is desired to place the aperture A' above the shaft.

What I claim is:

1. In motion picture apparatus, the combination with a rotary shutter, of a distinct plate normally barring the passage of light to the film, and centrifugal devices mounted upon the shutter and provided with normally inactive means adapted to move the plate out of light-obstructing position when the shutter rotates rapidly.

2. In picture projecting apparatus, the combination with a stationary plate having an aperture for the passage of light to a film alongside the plate, of a rotary shutter, a swinging plate normally barring the passage of light to said aperture, normally disconnected frictionally engaging means for swinging said swinging plate out of obstructing position, and centrifugal devices carried by the shutter and arranged to throw said frictionally engaging means into action when the speed or rotation of the shutter exceeds a certain limit.

3. In motion picture apparatus, the combination with a stationary plate provided with an opening for the passage of a light beam to the film, of a shutter rotating alongside said plate upon a suitable shaft, a loose sleeve revolubly mounted upon the same shaft, a plate secured to the sleeve and normally in position for obstructing said beam, and a centrifugal clutch carried by the shutter and arranged to engage the sleeve frictionally and impart angular movement thereto whenever the speed or rotation of the shutter exceeds a certain rate.

4. In motion picture apparatus, the combination with a stationary frame plate having an aperture for the passage of a projecting light beam, of a shaft fixed to the plate, a shutter parallel to the plate and rotating on said shaft, a swinging plate mounted upon said shaft and normally barring the passage of light to said aperture, two oppositely sliding approximately radial rods mounted upon the shutter and each at its inner end loosely encircling the support of said swinging plate, and a stop limiting the angle through which the rotary plate may swing.

In testimony whereof I affix my signature in presence of two witnesses.

CHARLES FRANCIS JENKINS.

Witnesses:
JOSEPH ROGER WHITE,
JAMES L. CRAWFORD.